United States Patent Office

2,877,500
Patented Mar. 17, 1959

2,877,500

PROCESS FOR PREPARING TRANSPARENT POLYETHYLENE

William C. Rainer, Edward M. Redding, and Joseph J. Hitov, Baltimore, Md., and Arthur W. Sloan and William D. Stewart, Alexandria, Va., assignors, by mesne assignments, to W. R. Grace & Co., Cambridge, Mass., a corporation of Connecticut No Drawing. Application June 17, 1955
Serial No. 516,236

19 Claims. (Cl. 18—48)

The present invention relates to a process for preparing polyethylene of improved clarity or transparency which polyethylene has been irradiated.

Polyethylene is widely used today in making containers, closures, squeeze bottles, toys, film packaging materials, etc. Despite its many advantages in these and other uses, it suffers from the disadvantage that it is normally translucent or opaque rather than transparent in appearance at room temperature and, hence, cannot be used in applications where a clear, water-white material is desired.

It is known that solid polyethylene can be physically transformed into a clear, transparent viscous substance, when elevated to its transition point which is approximately 105° to 125° C. However, this transparency is normally lost upon cooling, unless special methods are employed and, even with such special methods, the transparency is not retained if the polymer is heated to its transition point and clowly cooled. The transition point of polyethylene is commonly referred to as its transparent or softening temperature. There also is some variation in transition point, depending on the average molecular weight of the polymer. With a molecular weight of about 20,000 the transition point is generally about 110° C.

In the past, it has been proposed to make transparent polyethylene film by heating polyethylene and then quick cooling the same to room temperature or below. Alternatively, it has been suggested to obtain transparency by stretching the polyethylene. These procedures, while giving transparent polyethylene, suffer from the disadvantage that this transparency is not retained if the polyethylene is submitted, for example, to further physical changes, such as heating and slow cooling and, it has not proven feasible to retain the clarity during subsequent shaping operations.

Polyethylene, when heated to its transparent point, has a tensile strength which is nearly zero, for it is in a soft, plastic condition. In order to hot-stretch-orient polyethylene, stretching must commence while it is in the plastic state at approximately zero tension, which tension increases as cooling develops. This method will produce relatively clear films, but said films are somewhat frosty in appearance and have very limited commercial application, since the thickness thereof, by reason of the extremely low tensile factor at the initiation of stretch, must be controlled to less than 5 mils to have any practical significance.

Accordingly, it is the primary object of the invention to prepare polyethylene in film or sheet form, ranging in thickness from one to at least 100 mils, but preferably about 50 mils, which at room temperature is not only transparent, but preeminently crystal clear.

Another object of the present invention is to prepare a polyethylene which remains clear and transparent, e. g., water-white, regardless of change in physical form. For example, films of such clear and transparent polyethylene can be heated to at least its transition point, molded into desired shape and then recooled to form a new product which retains the clarity and transparency of the original film.

It is a further object of the invention to prepare a polyethylene which can be molded by conventional transfer and compression molding procedures to obtain a clear, water-white product.

Another object of the invention is to prepare a clear, water-white polyethylene of increased strength and toughness.

A further object is to prepare an irradiated polyethylene which is clear, transparent and free from gas bubbles.

Aonther object is to prepare a clear, stretched polyethylene which has increased resistance to shinkage upon heating.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained in a practical manner if the polyethylene is first conditioned by irradiation at a dosage desirably of at least about $20 \times 10^6$ REP, although, it should be noted that some improvement is noted in dosages as low as $10 \times 10^6$ REP or even $6 \times 10^6$ REP, at a temperature below its softening point.

It is then heated to or beyond its transparent point, where it now performs as a rubbery solid, manifesting a tensile strength of greatly increased proportions. Advantage is taken of this property to stretch orient the irradiated polyethylene at this temperature, or above, but below the point where pronounced softening occurs, while it is fully transparent. After cooling to room temperature, while being maintained in the stretched condition, translucency no longer returns. The fulness of clarity of the polyethylene at its transition point is then maintained at room temperature.

The degree of stretching should be sufficient to impart a noticeable improvement in the clarity of the polyethylene. For example, it can be heated and stretched 100%, 175%, 200%, 300%, or 500% or 900%, or even more. In many instances, it is preferable to stretch in one direction at least 250%. It is preferable to stretch-orient beyond the transparent temperature of the polyethylene for best results, although, good results may be obtained at or near the clear point, e. g., about 90° C., or above. The transparent temperature may be approximately 100° to 125° C., depending on the molecular weight of the polymer and the irradiation dose administered.

Orientation may be accomplished by uni-axial or bi-axial stretching. By uni-axial orientation, the molecules are assembled in columns facing in the direction of stretch, e. g., lateral or longitudinal. Orienting bi-axially moves the molecules into both a forward and a lateral arrangement.

When such hot calendering is employed, the sample may be 1000 mils thick or even more, and can be calendered to an extent sufficient to reduce the thickness in half or less to develop clarity. The calendering can be done in one operation or the sample can be passed repeatedly through the calendering rolls in order to develop stretching to give the desired clarity. The sample should be hot, e. g., about 90° C. or above, during the calendering, although, it is not essential that the rolls be hot, due to the fact, that the sample will only be in contact with the rolls for a very short period of time and, hence, there will not be significant cooling of the sample by heat transfer. If the sample is stretched by repeated passage through the calendering rolls, care should be taken that the rolls are not so cold as to substantially reduce the temperature of the sample, or, if necessary, the sample can be reheated between the successive passages through the rolls, or the rolls themselves may be suitably heated, e. g., to 90° C., in order to maintain the necessary temperature of the sample. To predominantly bilaterally stretch the polyethylene film, it can be passed through the calendering rolls while the sample is hot, first in one direction and then passed through the rolls a second time and in a direction perpendicular to that of the first passing.

The hot stretching can also be accomplished, for example, by pulling on the opposite ends of the sheet, e. g., at 110° C. Bilateral stretching can be obtained in this procedure if the sample is held between clamps on one set of opposite ends of the sheet, for example, a square sheet, and pulled first in one direction and then held between clamps on the second set of opposite ends of the sheet and pulled in a second direction perpendicular to the first direction of stretch.

It is very important to irradiate before stretching. Thus, it has been found that, unless irradiation is carried out before stretching, it is not possible to maintain absolute clarity in thicknesses above 5 mils. Additionally, if irradiation is carried out after stretching, frosty transparency is maintained rather than the crystal transparency obtained when irradiation is carried out prior to stretching.

It is also possible, and frequently desirable, to further irradiate after the hot stretching, in order to fix the clarity against subsequent change, as well as to increase the resistance to shrinkage. Such additional irradiation can be done at room temperature or any other temperature below the transition point. Preferably, this additional irradiation is carried out at a temperature below the point where shrinkage will occur in the absence of the additional irradiation, in order to impart the increased resistance to shrinkage.

The polyethylene can be irradiated at any convenient temperature below the transition point prior to stretching. Thus, in some instances, temperatures of 100° C., or even slightly above, can be employed, or there can be used temperatures as low as room temperature (about 20° C.), or even below, such as 0° C. for example. The lower temperature limit is that point at which free radicals cannot be formed in significant amounts from the polyethylene. Preferably, room temperature is used.

The polyethylene employed should be one which is solid at room temperature and may have a molecular weight of 7,000; 12,000; 19,000; 21,000; 24,000; 30,000; 35,000 or even higher. For many useful results, the molecular weight should be at least 12,000, and preferably the molecular weight is about 20,000 to 28,000.

It is surprising that irradiation, subsequent to stretching, will set or fix the clarity and increase the resistance to shrinkage of the polyethylene, as set forth herein.

The following examples additionally illustrate typical methods of carrying out the invention.

EXAMPLE I

Polyethylene film, molecular weight about 20,000, having a thickness of 50 mils, was subjected to an electron beam at room temperature. The source of the electron beam was a Van de Graff electrostatic generator, manufactured by the High-Voltage Engineering Corporation, Cambridge, Mass. This machine is a high voltage X-ray generator and was modified by removal of the tungsten target from the path of the electrons to permit thereby irradiation of the objects at the port. The generator was operated at two million volts with an amperage of 41 microamps at the target area per inch of scan.

The polyethylene film was then held between clamps, heated to about 110° C. until clear, and longitudinally stretched 800% to maintain the clarity, and maintained under tension with the aid of the clamps which were secured to the ends of the film. The film was kept under this tension to prevent shrinkage and loss of clarity while cooling slowly to room temperature.

It was observed that a stay under the electron beam of above 3.75 seconds was necessary in order to obtain a product which could be satisfactorily maintained under tension at 110° C. and it was found preferable to employ a stay of 7.5 seconds. With the instrument employed, a dosage of $2 \times 10^6$ REP is given with each 0.75 second of treatment.

EXAMPLE II

A sheet of polyethylene of approximately 21,000 molecular weight, 35 mils thickness, was irradiated under the 2 m. e. v. beam of Example I, at $20 \times 10^6$ REP at room temperature and was subsequently heated to and slightly beyond the point of clarity and, while in said condition, was stretched longitudinally 900% of its original length while held between clamps. Simultaneously, it contracted laterally to about ¼ its original width. After removing the source of heat, and while still under stretched tension, the sheet was cooled slowly to room temperature. An amazing phenomenon occurred. The sheet did not return to its former translucency and was not only transparent, but preeminently crystal clear. The resultant sheet, through the above process, was reduced to a thickness of 14 mils. After exposure to a temperature of 93° C. for 15 min., the finished sheet evidenced a total increase in thickness of approximately 5.9%; at 79° C., no change in dimensions was apparent.

EXAMPLE III

The clear film formed in Example II was given a further irradiation dosage of $50 \times 10^6$ REP at room temperature without being maintained under tension. The film was then heated to 93° C. for 15 min. without noticeable change in dimension and the crystal clarity was also retained upon subsequent slow cooling to room temperature.

EXAMPLE IV

A polyethylene sheet, having a molecular weight of about 20,000 and a thickness of about 40 mils, was irradiated as in Example I until it had received a dosage of $20 \times 10^6$ REP at room temperature. Clamps were secured to both pairs of opposite ends of the sheet and it was heated to the point of full clarity (about 110° C.). When full clarity had developed, it was stretched longitudinally 220% and then was stretched laterally 220% at the same temperature. The bilaterally stretched polyethylene film was then allowed to cool slowly to room temperature while under tension and then the clamps were released. The film was clear.

EXAMPLE V

Polyethylene sheet, molecular weight about 21,000, having a thickness of 166 mils, which had been given an irradiation dosage of $20 \times 10^6$ REP at room temperature, was heated to 120° C. which is beyond the point of clarity, and then passed six times through hot calendering rolls having a temperature of approximately 82° C. to stretch the polyethylene in a longitudinal and lateral direction simultaneously (biaxial orientation). The calendering rolls were set at varying clearances to reduce the polyethylene gradually to 85 mils. The clearances between the rolls were as follows:

|  | Inches |
|---|---|
| First setting | .060 |
| Second setting | .055 |
| Third setting | .050 |
| Fourth setting | .046 |
| Fifth setting | .043 |
| Sixth setting | .037 |

The hot stretched polyethylene sheet was then quenched to room temperature by being immersed in water. The resultant sheet was unusually clear. The change in physical dimensions of the sample was as follows:

| | Sheet before Calendering | Sheet after Calendering | Percent Change |
|---|---|---|---|
| Length | 34 mm | 50 mm | 47 |
| Width | 33 mm | 46 mm | 39 |
| Thickness | 166 mils | 85 mm | 48 |

By initiating calendering when the sheet is hot and clear, stretching of the polyethylene can be reduced below the 100% level to develop the desired clarity at room temperature. If, however, the sheet is not heated to the point of full clarity of the polyethylene, an increase in longitudinal stretch with an accompanying decrease in lateral stretch will occur, as is shown in the following example.

EXAMPLE V-A

Another polyethylene sheet, of the same molecular weight and given the same irradiation treatment as above, was heated only to 93° C. and then passed six times through hot calendering rolls having a temperature of 82° C., as indicated above. The calendering rolls were set at the same varying clearances as described above. The change in physical dimensions of the sample was as follows:

| | Sheet before Calendering | Sheet after Calendering | Percent Change |
|---|---|---|---|
| Length | 33 mm | 78 mm | 136 |
| Width | 33.5 mm | 42 mm | 25 |
| Thickness | 163 mils | 58 mm | 64 |

The resultant sample was quite clear.

Instead of primarily uni-axially stretching the polyethylene by hot calendering, another sample of the polyethylene was bi-axially stretched by this method by passing the film a first time through the rolls as above and a second time through the hot calendering rolls in a direction prependicular to that of the first passage. Thus, the same polyethylene film as Example I which, however, had received an irradiation dosage of 28×10⁶ REP at room temperature, in the manner described in Example I, was heated to 93° C. and passed repeatedly through the hot calendering rolls at about 85° C. until stretched longitudinally 250% and then the film, at the same temperature, was passed through the hot rolls in a direction perpendicular to the previous one to obtain a 250% lateral stretch, and was then quenched to room temperature. The sheet was increased in length from 34 mm. to 119 mm. and in width from 28 mm. to 98 mm. The resulting sheet was very clear.

The bilaterally stretched polyethylene could then be further irradiated, if desired, in the manner previously set forth, e. g., with a further dosage of 50×10⁶ REP at 25° C.

EXAMPLE VI

A sample of polyethylene molecular weight 21,000 (Bakelite DYNH), having a thickness of about 166 to 171 mils, was irradiated with the apparatus of Example I at room temperature to give a dosage of 52×10⁶ REP and was then heated to 120° C., at which temperature it was clear. This sample was then quenched to 25° C. by immersion in a large volume of water. A substantial amount of the clarity was retained. The sample was then heated to 93° C. and passed a single time through calendering rolls which were at room temperature. The polyethylene film was reduced in thickness to 119 to 122 mils (about 28%) and had an improved clarity. The sample was then allowed to cool to room temperature. Upon reheating of the sample to 79° C., there was noted a total increase in thickness of approximately 0.8%.

This example demonstrates the fact that, when quenching is employed to aid in the development of clarity, it is possible to reduce, by a considerable amount, the total stretching required to get optimum clarity.

Another sample of the same polyethylene as that employed in Example 6 was irradiated as in Example VI, to give a dosage of 52×10⁶ REP. This sample was heated to 93° C., and while at that temperature, calendered on the same rolls as in Example VI, with the rolls being at room temperature. The percent stretch obtained was the same as in Example VI. No significant increase in clarity was noted. When the sample was heated to 79° C., there was a total increase in thickness of approximately 5.9%, in contrast to the increase of only 0.8% in Example VI. From the above, it is evident that the addition of the quenching step materially reduced the tendency to revert to the condition of the sample prior to stretching.

In Example VI, if hot calendering rolls, e. g., rolls maintained at 93° C., are substituted for the cold calendering rolls, there is no substantial change in dimensions of the sample in the 79° C. test. Normally, the slight amount of change in dimensions imparted by employing cold calendering rolls is not critical. However, where it is important to have absolutely no change in dimensions, it is advisable that the calendering rolls be maintained hot.

EXAMPLE VII

The process described in Example VI was repeated with the same polyethylene, but having a thickness of 140 to 144 mils for the sample which was quenched and 137 to 138 mils for the sample which was not quenched, and the irradiation dosage was 40×10⁶ REP. The quenched sample, after calendering, was reduced in thickness 32% and the unquenched sample was reduced in thickness 33%. In the 79° C. test, the quenched sample had an increase in thickness of 1.1% and the unquenched sample had an increase in thickness of 3.3%.

EXAMPLE VIII

The procedure of Example VI was repeated, using a dosage of 28×10⁶ REP and there was included a third sample maintained at room temperature which was merely calendered at this temperature and was not heated to 93° C. The sample calendered at room temperature had a thickness of about 170 mils and was reduced in thickness about 37% by the calendering. The sample which was heated to 93° C. had a thickness of about 167 to 169 mils and was reduced in thickness about 32% by the calendering. The sample which was quenched and then heated to 93° C. had a thickness of 171 to 172 mils and was reduced in thickness about 37% by the calendering. In the 79° C. test, the sample which was merely calendered at room temperature, had a total increase in thickness of 37%. The sample which had been heated to 93° C. had an increase in thickness of 1.8%, and the sample which had been quenched before heating to 93° C. also had an increase in thickness of 1.8%.

From the results obtained in Examples VI, VII and VIII, it can be seen that with increasing preliminary irradiation dosages, there is an increase in the tendency to return to the former dimensions with the samples that have been heated to 93° C., but have not been quenched. This is as would be expected. On the other hand, it will be noted that the samples which received the quenching treatment showed a reversed tendency to revert to the original dimensions, which is, indeed, surprising. In addition, the samples which received the quenching treatment also always had a desirable low tendency to revert to the former dimensions through the range of irradiation dosages tested.

As will be understood, shrinkage in a longitudinal or lateral direction, or both, of the polyethylene is normally accompanied by an increase in thickness so that the total volume occupied by the sheet remains substantially constant.

It has now been found that, if polyethylene is first subjected to a definite minimum irradiation dose below its transition point, where it does have adequate strength, and then heat-stretched in the manner set forth above, that crystal clear polyethylene can be prepared without the formation of blisters.

Relative to retaining clarity by further irradiation after stretching, at a dosage level of $20 \times 10^6$ REP, the increase in retention of transparency becomes evident to a significant amount. At $6 \times 10^6$ REP, the retention is pronounced. In ascending order of dosage, this retention of transparency is progressively enhanced, being quite good at $20 \times 10^6$ REP, until at $52 \times 10^6$ REP, a mere trace of translucency appears after subsequent heating to the transition point and slow cooling. At an even higher dosage, e. g., $76 \times 10^6$ REP, even this trace of translucency does not occur and the irradiated polyethylene retains all the water-white clarity of the treated product, despite subsequent heating to the transition point and slow cooling and/or reheating to shape or mold. It is advisable that the total amount of irradiation be kept below $200 \times 10^6$ REP for, at this dosage, polyethylene assumes a permanent amber tint. Dosages below $100 \times 10^6$ REP are normally preferred.

The present method of preparing clear irradiated polyethylene is superior to cold calendering in obtaining films (and other articles) which are resistant to change in thickness upon heating, as is shown in the following table. In the table, all of the samples were prepared from the same polyethylene, molecular weight about 20,000, reduced in thickness from about 155 mils to about 30 mils, in the case of the cold calendered sample and were given the indicated irradiation dosage at room temperature with the machine described in Example I. The hot stretched sample was prepared by pulling the polyethylene film from 35 mils to 14 mils thickness at its transition point and cooling to room temperature slowly.

In the table, the cold calendered samples were calendered at room temperature.

*Table*

COLD CALENDERED BEFORE IRRADIATION

| Dosage | Shrinkage after 15 min. in the oven at— | | | |
|---|---|---|---|---|
| | 66° C. | 79° C. | 93° C. | 107° C. |
| | Percent | Percent | Percent | Percent |
| 0 | 9.3 | 35 | | 168.0 |
| $20\times10^6$ REP | 9.3 | 34.4 | | 350.0 |
| $40\times10^6$ REP | 1.9 | 14.8 | 41.2 | 241.0 |
| $52\times10^6$ REP | 1.9 | 10.0 | 41.4 | 251.0 |
| $76\times10^6$ REP | 0.0 | 6.7 | 26.7 | 191.0 |
| $100\times10^6$ REP | 0.0 | 6.2 | 24.8 | 170.0 |
| $200\times10^6$ REP | 0.0 | 0.0 | 14.3 | 62.9 |

HOT STRETCHED AFTER IRRADIATION

| | | | | |
|---|---|---|---|---|
| $20\times10^6$ REP | 0.0 | 0.0 | 5.9 | 44.1 |

From the above, it is clear that with a much smaller degree of irradiation, the hot stretched sample was much more completely resistant to shrinkage upon heating to elevated temperatures.

A REP, as is recognized in the art, is defined as that amount of nuclear radiation which dissipates 93 ergs of energy per gram of tissue producing $1.61 \times 10^{12}$ ion pairs in the process. It is approximately equal to the amount of energy that would be dissipated by a one roentgen X-ray beam in a gram of tissue.

As the amount of irradiation dosage administered is increased, the polyethylene diminishes in thermoplasticity until finally, transformation is effected into a thermosetting plastic.

The amount of cross-linking developed in irradiated polyethylene beyond the $76 \times 10^6$ REP level does not lend itself easily to subsequent working. It is, therefore, desirable to confine calendering and compression molding procedures to polyethylene which has been irradiated at dosage levels not over $76 \times 10^6$ REP.

It is also possible to mold the hot stretched and previously irradiated polyethylene by the above procedures which, of course, is an advantage of the present invention. The use of a second irradiation step after the stretching has the advantage that, it is no longer necessary to maintain the polyethylene under externally applied tension and the clamps, for example, used in some of the examples, can be removed as the clarity has become further fixed against subsequent physical changes.

The desired shaping, for example, can be carried out at the original transition temperature of the polyethylene which, of course, is below the melting point of the irradiated product, without loss of clarity. With a treatment of $50 \times 10^6$ REP or above, e. g., $100 \times 10^6$ REP, pressure and vacuum postforming of the polyethylene sheets is still practical as with other types of thermosetting resins.

A dosage of about $20 \times 10^6$ REP has been found to be preferred in many instances since, with this dosage, a product is obtained which has excellent clarity and can also be subsequently readily molded.

The time of irradiation, while not critical, as long as a dosage of sufficient REP is attained, can vary between 0.75 second and 75 seconds, preferably between 7.5 seconds and 45 seconds, with the apparatus of Example I. The voltage can also vary quite widely and can be 750,000 or 1,000,000 or 2,000,000 or 3,000,000 or 6,000,000 volts, or even higher. In any event, the voltage should be sufficiently high to induce the cross linking necessary to give the desired light transmission. By appropriate combination of time of treatment and voltage, the desired REP dosage can be obtained.

The polyethylene treated by irradiation can have a thickness of 3 mils or less, e. g., 1 mil, up to 100 mils, or even higher, e. g., 250 mils, and is preferably about 25 to 125 mils. For thicknesses above 250 mils, the voltage should be above 2,000,000. It is preferable that the film be stretched to reduce the thickness to about 10 to 50 mils.

Ozone has an adverse effect upon polyethylene. Consequently, it is frequently desirable to have good ventilation or to carry out the irradiation while the polymer is in an atmosphere of inert gas, such as nitrogen or argon. Thus, the irradiation process of Example II can be carried out while continuously passing a stream of argon over the polyethylene.

It is also sometimes desirable to carry out the irradiation while the polyethylene is maintained in a vacuum, e. g., 1 mm. or less. Thus, the irradiation in Example II can be carried out while the polyethylene is in a vacuum of 0.1 mm. total pressure.

While the irradiation is preferably carried out with electrons, as set forth above, it is also possible to use other means of irradiation. Thus, if the tungsten target is put back, the machine described in Example I will permit X-rays to hit the polyethylene by placing the polymer by the side of the target. However, irradiation with X-rays takes longer than with electrons to obtain the same effect. It is also possible to irradiate with β-rays, e. g., by employing cobalt 60, carbon 14, phosphorus 32, or strontium 90, as a source of irradiation. Gamma-rays can be used, e. g., by submitting the polyethylene to irradiation from iron 59 or cobalt 60. Neutrons, protons, α-particles and deuterons also may be employed to bombard the polyethylene.

Instead of using the Van de Graff electrostatic generator as the source of the electron beam, other sources of high energy electrons can be employed, such as the General Electric 800,000 volt resonant transformer unit described by Lawton et al. in Industrial and Engineering Chemistry, volume 46, pages 1703 to 1709.

As previously set forth, a process, such as that described in the Lawton article, will not produce a clear polyethylene, as irradiation can only substantially preserve the clarity present at the time the irradiation treatment and Lawton treats conventional translucent polyethylene at room temperature.

There can also be employed other conventional apparatus for producing beams of electrons, such as those recited, for example, in Brophy Patent No. 2,668,133, column 3, lines 5 to 29.

As previously pointed out, for best results, the irradiation dose should be at least about $20 \times 10^6$ REP and the polyethylene should have a molecular weight before irradiation of about 20,000 or above. With polyethylene having a molecular weight of 7,000, it is necessary to employ a dosage of at least $100 \times 10^6$ REP, in order to get satisfactory cross-linking and even higher dosages are necessary for lower molecular weight polymers. Correspondingly, lower dosages can be used to obtain cross-linking of higher molecular weight polymers.

The transparent polyethylene can be formed into valuable products in any of the conventional ways employed with customary translucent polyethylene, such as by making sheets or blown films for packaging purposes, vacuum molding, pressure molding, or even by punching out or stamping articles, e. g., cap liners or ring gaskets, from blanks.

The transparent polyethylene prepared in accordance with the present invention can be employed in many instances where clear vinyl resins or acrylates and methacrylates are now used. This polyethylene is of particular advantage, due to its increased strength and resistance to elevated temperature.

We claim:

1. A process comprising irradiating polyethylene at a dosage of at least about $2 \times 10^6$ REP at a temperature below its initial softening point for a time sufficient to substantially raise the softening point and then hot stretching it in at least one direction at least 100% at at temperature no lower than about 75° C. and thereafter cooling the hot stretched polyethylene.

2. A process according to claim 1, wherein the irradiation dosage is between about $6 \times 10^6$ and $100 \times 10^6$ REP.

3. A process according to claim 1, wherein the irradiation is carried out with electrons at a dosage between about $6 \times 10^6$ and $100 \times 10^6$ REP and the polyethylene after stretching has a thickness between about 3 and 250 mils.

4. A process according to claim 1, wherein the stretching is continued until the polyethylene has a length at least 250% of its original length and at a temperature not lower than about 100° C.

5. A process according to claim 4, wherein the irradiation is carried out with electrons.

6. A process according to claim 1, in which the polyethylene is unilaterally stretched.

7. A process according to claim 1, in which the polyethylene is bilaterally stretched.

8. A process according to claim 1, wherein the irradiation is carried out with electrons at a dosage of about $2 \times 10^6$ to $100 \times 10^6$ REP.

9. A process according to claim 8, wherein the dosage is about $6 \times 10^6$ REP to about $75 \times 10^6$ REP.

10. A process according to claim 1, in which the irradiation is carried out with electrons at room temperature.

11. A process according to claim 1, wherein the polyethylene subsequent to stretching is further irradiated to fix the clarity.

12. A process according to claim 11, wherein the irradiation is carried out with electrons at a total dosage of between about $20 \times 10^6$ and $100 \times 10^6$ REP.

13. A process according to claim 12, wherein the total irradiation dosage is about $50 \times 10^6$ to $75 \times 10^6$ REP.

14. A process according to claim 1, wherein the hot stretching is accomplished by calendering to partially reduce the thickness of the polyethylene.

15. A process comprising irradiating polyethylene at a dosage of at least about $2 \times 10^6$ REP at a temperature below its initial softening point for a time sufficient to substantially raise the softening point and then bilaterally hot stretching it at least 250% in each direction at a temperature no lower than about 75° C.

16. A process according to claim 15 wherein the temperature is no lower than about 90° C. and the irradiation is carried out with electrons.

17. A process comprising irradiating polyethylene at a dosage of between about $6 \times 10^6$ REP and $75 \times 10^6$ REP with electrons at a temperature below its initial softening point for a time sufficient to substantially raise the softening point and then bilaterally hot stretching it at least 100% in each direction at a temperature no lower than about 75° C.

18. A process according to claim 1 wherein the polyethylene is subjected to the step of shaping.

19. A process according to claim 1 wherein the polyethylene after stretching has a thickness between about 1 and 3 mils.

References Cited in the file of this patent

UNITED STATES PATENTS

| | | |
|---|---|---|
| 2,219,700 | Perrin et al. | Oct. 29, 1940 |
| 2,505,082 | Amon | Apr. 25, 1950 |
| 2,608,717 | Kay | Sept. 2, 1952 |
| 2,668,133 | Brophy et al. | Feb. 2, 1954 |
| 2,762,791 | Pease et al. | Sept. 11, 1956 |
| 2,804,652 | Balkan | Sept. 3, 1957 |
| 2,812,550 | Chavannes | Nov. 12, 1957 |

FOREIGN PATENTS

| | | |
|---|---|---|
| 1,058,934 | France | Mar. 19, 1954 |

OTHER REFERENCES

Sun: "Effects of Atomic Radiation on High Polymers," Modern Plastics, September 1954, pp. 141–4, 146, 148, 150, 229–33, 236–38.

Nature, July 11, 1953, pp. 76, 77.

"Irradiated Polyethylene," Modern Plastics, April 1954, pp. 100, 101, 219.

Charlesby: Cross-linking of Polythene by Pile, Proc. Royal Society, vol. 215A, page 189.

Nature, Dec. 20, 1952, "Irradiation of Linear High Polymers," pp. 1075–6.